UNITED STATES PATENT OFFICE.

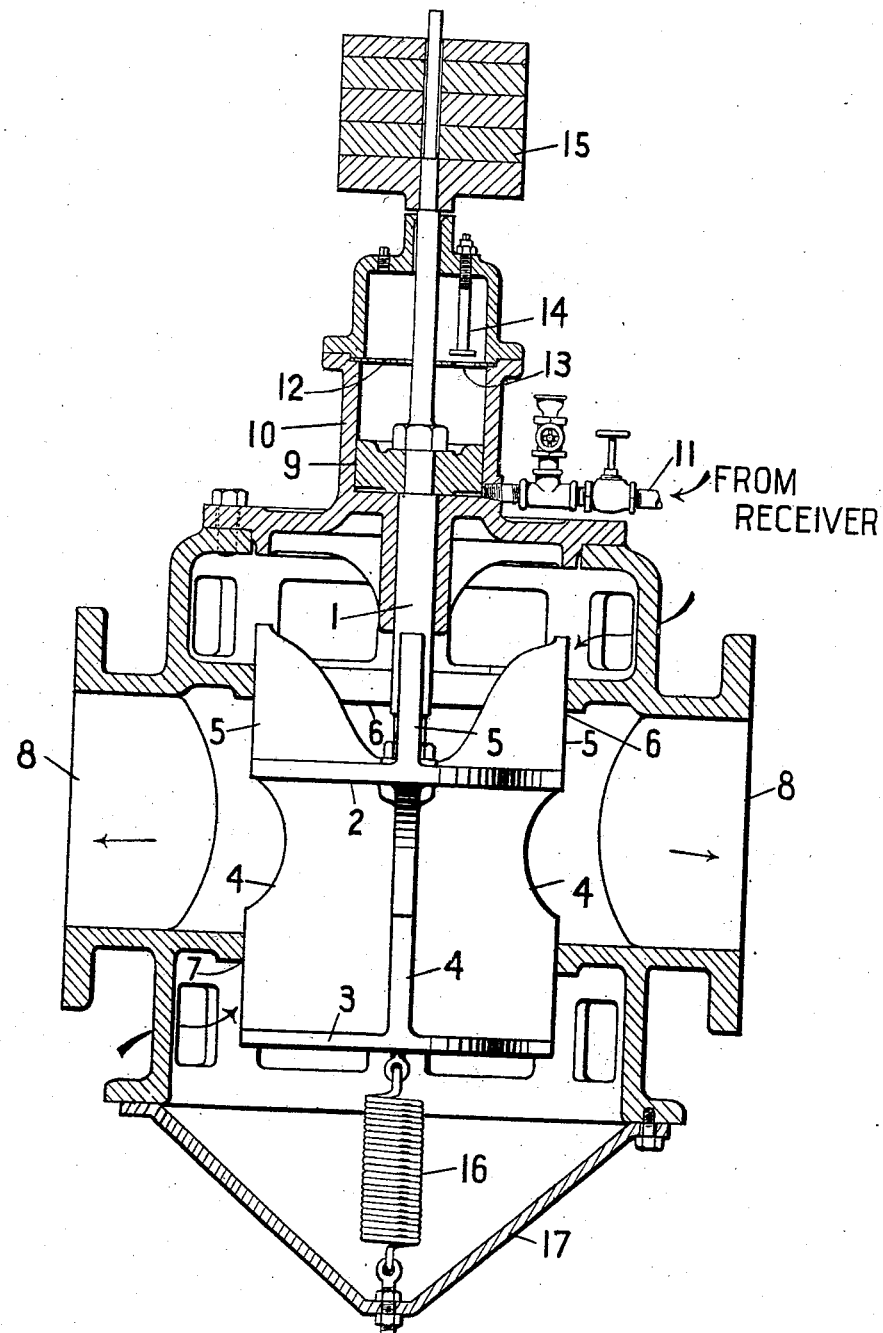

JAMES TRIBE, OF MILWAUKEE, WISCONSIN, ASSIGNOR TO ALLIS-CHALMERS COMPANY, OF MILWAUKEE, WISCONSIN, A CORPORATION OF NEW JERSEY.

UNLOADING DEVICE.

No. 915,319.     Specification of Letters Patent.     Patented March 16, 1909.

Application filed January 22, 1906. Serial No. 297,173.

*To all whom it may concern:*

Be it known that I, JAMES TRIBE, a citizen of the United States, residing at Milwaukee, in the county of Milwaukee and State of Wisconsin, have invented certain new and useful Improvements in Unloading Devices, (Case A,) of which the following is a specification.

This invention relates to mechanism for actuating an element, and more particularly to steadying the movement of a pressure actuated reciprocating element, which element is caused to change its position with each change of pressure.

This invention has utility when applied to control or regulate. So used in connection with the valve, it affords an economical and efficient unloading device for blowers or compressors.

Referring to the drawing: The element 1 has the disks 2 and 3 and guide wings 4 and 5 which serve to properly guide the disk portions of the valve to their seats 6 and 7 in the pipe or inlet main 8 leading to the compressor. The reciprocable element 1 of the valve has mounted thereon a piston 9 in the cylinder 10. Communicating with this cylinder 10 below the piston is the pipe 11 which may be connected to a source of pressure, as the receiver of a blowing engine or compressor. In the cylinder 10 on the opposite side of the piston 9 from the pressure inlet is a baffle plate or diaphragm 12 having an opening 13 therein. The piston on its side toward the diaphragm operates to force a liquid, as oil, through the opening 13. When the piston 9 is at the lower end of its stroke the level of oil should be above the diaphragm 12. The rapidity with which this operation occurs may be adjusted by the device 14. This cataract scheme serves as a fluid retarder and gives the travel of the valve a more steady movement.

The stem 1 is loaded with weights 15, by which means the desired pressure under which the valve is to operate may be definitely fixed. Connected to the valve is the spring 16, this resilient means having its opposite ends held by the casing 17. This spring is not intended for adjustment of air pressures, but is designed to hold the valve in one position only for one pressure. There must be no tension on the spring when the valve is open, but the tension commences immediately when the valve begins to rise and increases until the valve is closed. By this structure a valve may be so controlled as to at once, and with precision steadily attain a position corresponding to each variation of the pressure.

What is claimed and it is desired to secure by Letters Patent is:

1. The combination with a casing provided with an aperture, of a valve adapted to control the thoroughfare through said aperture, said valve being provided with a stem, a cylinder provided with a piston to which is secured said valve stem, means for introducing a fluid under pressure within said cylinder between one end thereof and said piston, said cylinder being also provided with a diaphragm provided with an aperture and means to control the passage of a fluid through the aperture of said diaphragm, said diaphragm being situated intermediate the ends of said cylinder, said piston being located within said cylinder between said diaphragm and that end of the cylinder which is adapted to receive a fluid under pressure, and a spring for opposing an increasing resistance to any movement of said valve toward its closed position.

2. The combination with a casing provided with an aperture, of a valve for controlling the thoroughfare through said aperture, said valve being provided with a vertically extended stem, a removable weight supported by said stem and adapted to maintain said valve normally open, means adapted to be actuated by a fluid under pressure connected to said valve and adapted to close the same against the resistance offered by said weight, fluid friction means for retarding the movements of said valve, and a spring opposing an increasing resistance to any movement of said valve toward its closed position.

3. The combination of a valve, a weight for holding the valve open, fluid pressure means for closing the valve, friction means for retarding the closing of the valve, and a spring for additionally opposing the closing of the valve and rendering the valve static.

In testimony whereof I affix my signature in presence of two witnesses.

JAMES TRIBE.

Witnesses:
G. F. DE WEIN,
GEO. E. KIRK.